Figure 1:
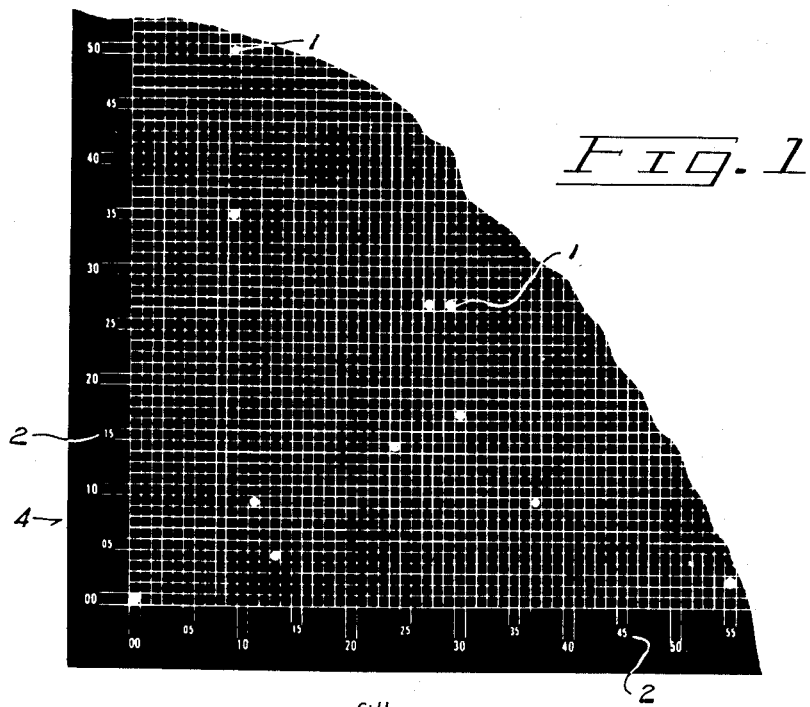

Feb. 23, 1965 F. JONKER 3,171,021
PRINTING OF SUPERIMPOSABLE CARD SYSTEMS
Filed Aug. 31, 1961

3,171,021
PRINTING OF SUPERIMPOSABLE CARD SYSTEMS
Frederick Jonker, Washington, D.C., assignor to Jonker Business Machines, Inc., a corporation of Delaware
Filed Aug. 31, 1961, Ser. No. 136,978
5 Claims. (Cl. 235—61.12)

This invention provides a number of improvements upon patent application #95,633 filed March 14, 1961, titled: "Printing of Superimposable Card Systems."

This invention pertains to information retrieval systems based on the use of superimposable cards dedicated to terms and the determination of coincidence of holes in said cards. These systems are also known as Peekaboo systems. Commercially they are known as Termatrex systems.

In the Termatrex systems, an item of information is prepared for entry into the system by first indexing it by a number of terms taken from a vocabulary of terms. Each item of information is given an accession number.

Termatrex systems are comprised of a number of cards each dedicated to a term. In total there will generally be a vocabulary of between 500 and 5000 terms. On each termcard is a place dedicated to a document in the collection. Each document has the same position dedicated to it on each termcard.

Items of information are entered into a Termatrex system by selecting all of the termcards by which that item has been indexed, placing these cards superimposition in a Termatrex machine and drilling a hole in all of these cards simultaneously at the position dedicated to that item of information.

The system is searched by selecting a number of termcards together describing a search question, and placing these in superimposition in a Termatrex machine. Next, a light in the bottom of the Termatrex machine is turned on. The coinciding holes in these termcards are then visible as light dots. The serial number of these light dots can then be read off one by one, for example, by means of a transparent grid with an x-y coordinate system on it.

Sometimes it is necessary to reproduce a set of superimposable cards hundreds or thousands or millions of times. This can be done by means of punching or drilling equipment; but this is a slow and costly process.

The invention, therefore, provides a method of reproducing such cards at the cost of only a fraction of a percent of the cost of punched or drilled cards, by the use of printing techniques. According to the invention, an image of the body of a perforated card is printed on substantially transparent material, with substantially opaque ink. Where the original superimposable card showed holes, the printed copy will not have ink. The rest of the sheet will have been covered with ink. An x-y coordinate readout grid can also be printed on it.

However, where millions of sets are to be printed, the most inexpensive paper should be used.

The above-mentioned patent application #95,633, therefore, provides for printing by the silk screen process, or a comparable process which allows large amounts of ink to be loaded on the paper, on ordinary paper of dots, as well as a grid of lines and numbers to read out the coordinates of said dots. In this the dots and lines and figures of the read out grid are left unprinted while the rest of the paper is covered with a heavy coating of opaque ink.

I have discovered the following disadvantages to this arrangement:

When loading large amounts of ink on the paper to give it the required opacity, the lines of the grid and the figures tend to fill in and become unreadable. On the other hand, when the grid is to be printed clearly, not enough ink can be loaded to provide the required degree of opacity.

In reading out, the contrast between white spots on the top sheets that are not lighted from below and those that are, becomes marginal when four or five sheets are superimposed.

The present invention overcomes these disadvantages by printing the read-out grid and numbers on the front of the paper, as black lines on a white background. For this printing an offset or any other process can be used. Heavy loading of ink is not necessary.

The other side of the paper (the backside) is heavily loaded with an opaque layer of ink, except at positions where the dots represent holes. They are left white.

In this way the maximum ink loading is possible. At the same time better contrast is provided while searching.

To improve contrast, according to the invention, the printing can also be done in a color, and in the read-out a color filter will be placed on top of the termcards. The lightsource, the color of the cards and the color filter will be matched in such a manner that all light going through the color printing on the cards will be absorbed in the color filter. This will greatly increase the contrast required for read-out.

It is also possible to use a source giving a different form of radiation than visible light, use a paper that is substantially transparent to this radiation and an ink that is substantially opaque to this radiation. For read-out it will be necessary to place a radiation converting material on the superimposed termcards that transforms said radiation into visible light, or a piece of material sensitive to said radiation that upon photographic development will show an image of the coinciding transparent spots. Such radiation and materials and developing processes are well known in the art.

FIG. 1 shows a corner of a printed termcard with transparent spots 1 and a read-out grid and scales 2 printed on it on the same side of the paper.

Figure 2:
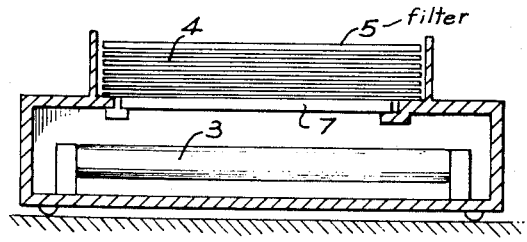

FIG. 2 shows the light box or source of radiation with lamps or bulbs or sources of radiation 3, a diffusor plate 7 and termcards 4.

Figure 3:
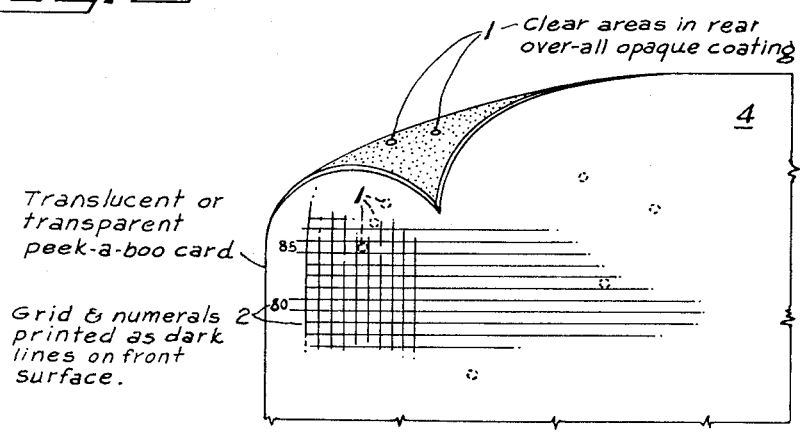

FIG. 3 shows the corner of the printed termcard of FIG. 1 with the corner turned over to disclose the back surface.

The invention is not limited to the methods and embodiments specified, but encompasses everything contained within the claims. Numeral 5 denotes a color filter or fluorescent plate for use in improving the visibility of the transmitted radiation.

I claim:

1. The method of making an information storage card of the peek-a-boo type, comprising (a) providing a rectangular card of substantially transparent material; (b) coating one surface of said card with a heavy, relatively opaque layer which is interrupted at localized discrete spots conforming to intersections of a rectangular coordinate array of grid positions, the positions of said spots defining the stored information and being sensible by virtue of their relative transparency; and (c) imprinting the opposite surface of said card with a material which is relatively non-reflecting, in a pattern of grid lines conforming accurately to said rectangular coordinate array.

2. The method in accordance with claim 1, in which said card is made of translucent paper.

3. The method in accordance with claim 1, in which said coating is accomplished by screen printing.

4. The method in accordance with claim 1, in which said imprinting of said grid pattern includes the imprinting of numerical indicia in association with certain of said grid lines.

5. An information storage card of the peek-a-boo type, comprising an imperforate rectangular sheet of translucent paper which is at least partially reflective, one surface of said sheet being coated, except at selected localized small spots in a rectangular coordinate array, with a substantially opaque layer, and the opposite surface of said sheet being imprinted with a relatively non-reflective pattern of grid lines conforming in accurate register to said rectangular coordinate array.

References Cited in the file of this patent
UNITED STATES PATENTS

| | | |
|---|---|---|
| 1,706,038 | Owens | Mar. 19, 1929 |
| 2,098,305 | Nichols | Nov. 9, 1937 |
| 2,268,498 | Bryce | Dec. 30, 1941 |
| 2,358,051 | Broido | Sept. 12, 1944 |
| 2,374,524 | Bowers | Apr. 24, 1945 |
| 2,774,821 | Brown | Dec. 18, 1956 |